United States Patent Office 3,564,377
Patented Feb. 16, 1971

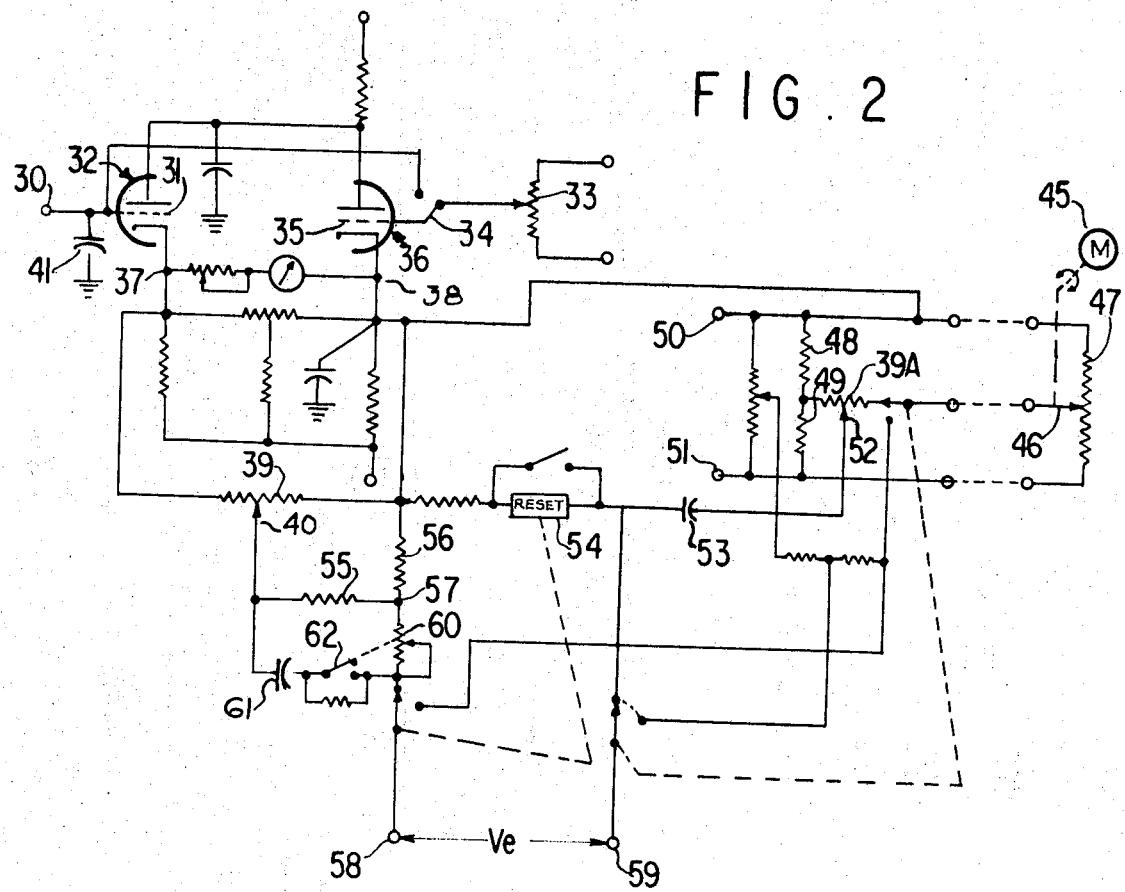
FIG. 2
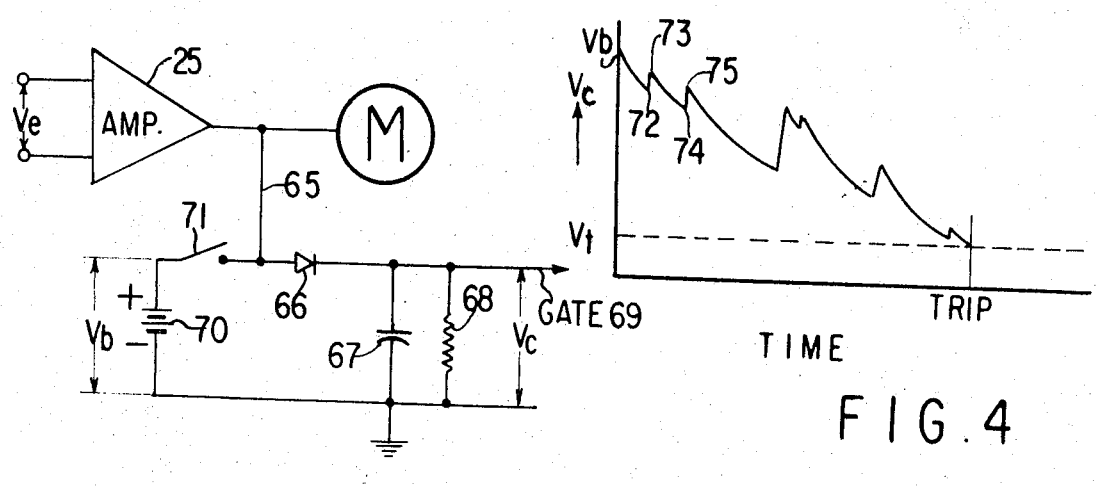
FIG. 3
FIG. 4

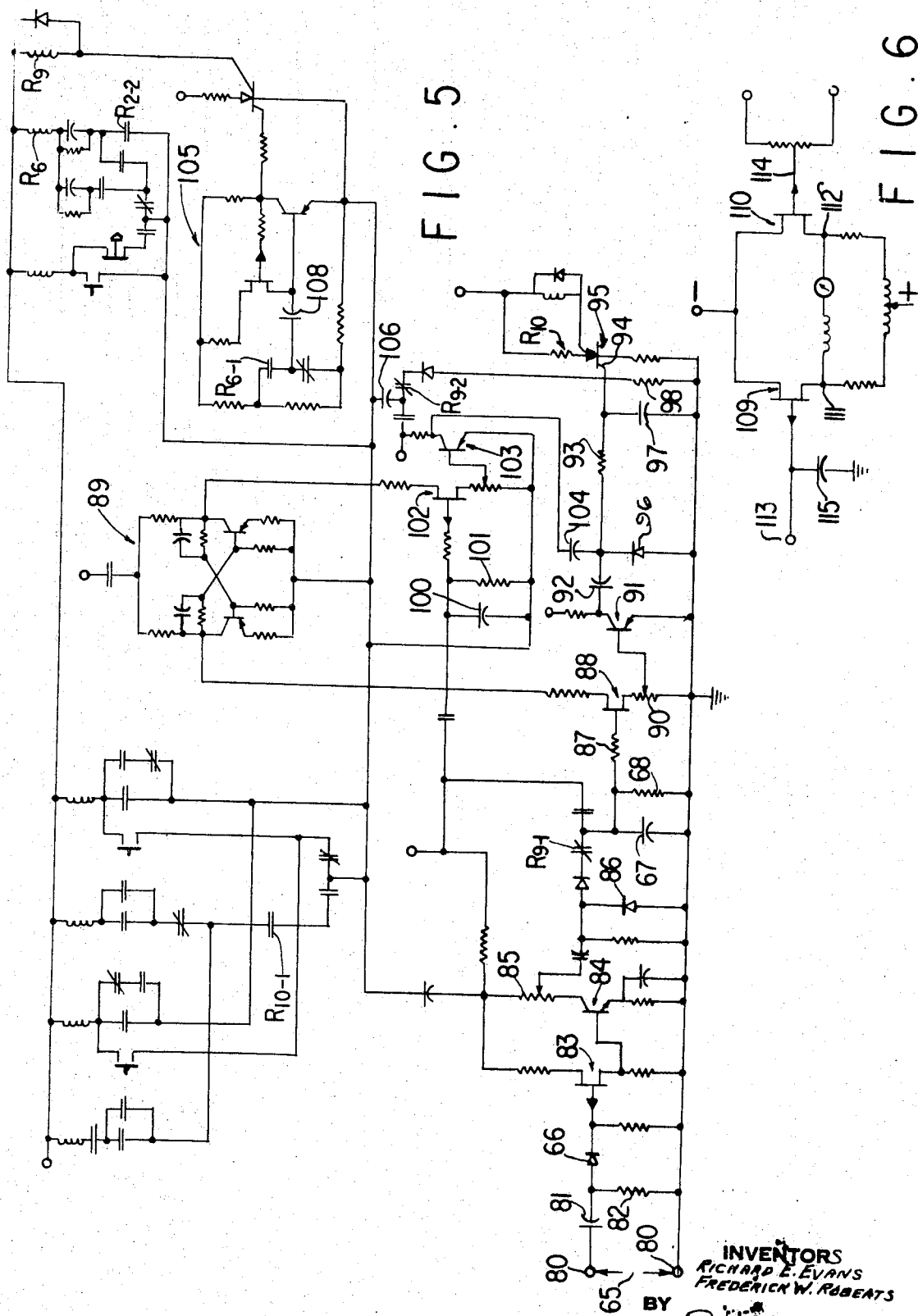

3,564,377
MULTIPOINT CONTROL SYSTEM
Richard E. Evans, Fort Lauderdale, Fla., and Frederick W. Roberts, Southport, Conn., assignors to Rolock Incorporated, Fairfield, Conn., a corporation of Connecticut
Filed Oct. 6, 1967, Ser. No. 673,466
Int. Cl. G05b 11/18, 11/32
U.S. Cl. 318—562    22 Claims

ABSTRACT OF THE DISCLOSURE

A multipoint industrial control system in which a plurality of units to be controlled are successively connected to a common sensor and to a plurality of three mode control modules, there being a separate module for each unit. A memory storage element at the input of each control module maintains the control circuitry at the last observed level of the process variable during the entire time that the sensor is connected to other stations so as to provide smooth transition of control from one cycle to the next. A variable switching means dependent upon demand allocates the dwell time of the sensor at any one unit or station to the demand or need for correction of the process variable. An overriding timing circuit effects switching of the control apparatus after a predetermined dwell of the sensor at any one station, thereby preventing undue dwell or locking of the sensor at a station.

---

This invention relates to control system for industrial apparatus such as a furnace and more particularly to a system in which a single sensor is utilized to effect control of a plurality of units, i.e., a multipoint control system.

Systems of this general type are well known in the industrial control art and are sometimes known as a time-sharing system since the single sensor shares it time among the several channels or units being controlled. In known systems of this type, however, it is customary to provide a clock-driven commutator which indexes the controller from one channel to another. The speed of the clock and the number of channels determine the time that the controller spends or dwells on each channel. The cycle is preset and can only be changed by changing the clock speed. While programmable clock-driven timers which permit the time allocated to each channel to be preset are also available, any subsequent change in program also requires manual alteration of the timers. Such timers, however, do not meet the changing needs of a multipoint industrial controller. The startup part of a process cycle, for example, requires more control than the later, more stable, portion of the cycle.

In conventional multipoint controllers, furthermore, the single sensing element is accompanied by only a single control module. The switch or change to another channel at a different process level is interpreted by the control module as a sudden change in process level and a large adjusment of the modulating valve is initiated through the action of the time dependent circuits. This is particularly undesirable in multipoint systems since both the process and the controller are upset and frequently neither is restored in the time available on station. Also in such systems, it is usually impossible to adjust the proportional band and the differential and integral time constants to even a reasonable compromise among the several channels.

One of the objects of the present invention, therefore, is to provide a multipoint control system in which the dwell of the sensor at any particular channel or unit depends upon the need for correction (error) of that particular station, in which "error" is the instantaneous difference between the analog process level and set point voltages.

Another object is the provision of a multipoint control system in which a delay at any particular station due to an unsatisfied process level adjustment is overridden by a predetermined timed channel switching means to prevent undue delay or locking of the sensor at the station.

A further object is the provision of the process demand switching circuit which is controlled by the voltage generated by the corrective instrumentality of the system.

A further object is to provide a multipoint control system having a common sensor in which each unit or channel to be controlled has an individual control element or module associated with its unit.

A still further object is the provision of a multipoint control system wherein the switching from one channel or station to another causes no substantial disturbance of the control of any station.

The foregoing and other objects, advantages and features of the inventoin will become apparent from the following description taken in connection with the accompanying drawings which illustrate an exemplary embodiment of the invention.

In the drawings:

FIG. 2 is a schematic wiring diagram of the control modules of the system;

FIG. 3 is an illustrative diagram of the demand responsive portion of the system;

FIG. 4 is an illustrative diagram of the voltages occurring on the storage capacitor of the demand responsive circuitry;

FIG. 5 is a schematic wiring diagram illustrating the circuitry for effecting channel switching under either demand or overriding predetermined time conditions; and FIG. 6 is a fragmentary wiring diagram showing another form of the error detecting circuit.

Figure 1:
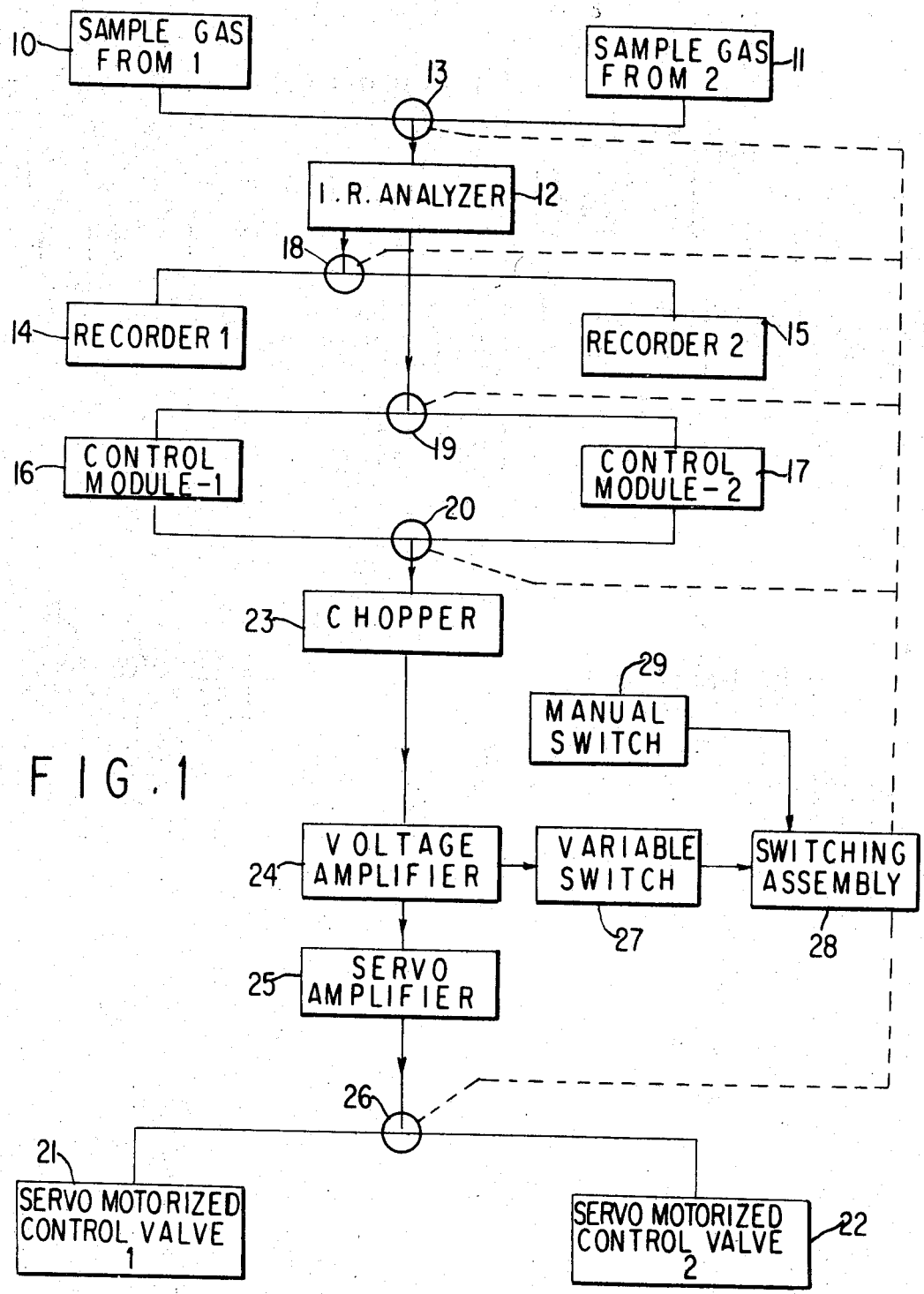
FIG. 1 is a block diagram illustrating one industrial application of the control system of the invention.

Referring now to the block diagram of FIG. 1, blocks 10 and 11 represent two units of industrial apparatus such as a pair of furnaces each having a process variable such as endothermic gas of which a constituent is to be measured for the purpose of controlling the process of the unit. A single or common sensing device 12, shown as an infrared analyzer, is successively switched from one unit to the other by a valve or the like 13 and provides an analog voltage output representing the value of the process variable. Each of the units 10 and 11 can be provided with separate recording instruments 14 and 15, respectively, and separate control modules 16 and 17, respectively, which are successively connected to the sensor 12 simultaneously with the switching of valve 13. Each of the control modules 16 and 17 preferably includes three mode (proportional band, integral, and derivative) control circuitry which compares the analog voltage from the sensor with a set point voltage representing a desired level or value for the process variable and produces an output or error signal proportional to or representing the deviation of the measured variable from the desired set point level as described hereafter. Also, the control circuitry could have any two of said modes. The output or error signals from the control modules 16 and 17 are fed alternately by a switching device 20 to the input circuits of a pair of servo motors, one of each unit, which operate the control valves 21 and 22 for the units 10 and 11, respectively. In the illustrated embodiment, the input circuit for the servos includes chopper 23, voltage amplifier 24, and servo amplifier 25, the latter being successively connected to the servo motors for the control valves 21 and 22 by switching device 26.

Connected to a suitable point, such as to voltage amplifier 24, of the input circuit for the control valve servo mechanisms, is a block 27 representing a variable switching circuitry. This circuitry allocates the time during which the sensor 12 remains connected to any one of the units or stations on the basis of the need of the unit for control, i.e., the dwell time of the sensor at any one unit or station is proportional to or depends upon the demand or need of the unit for correction. Thus, if there is little or no error and therefore little or no need for corrective control, the sensor after a predetermined time is quickly switched to the next unit or station. On the other hand, if there is substantial deviation from the set point value, the sensor remains as long as the error exists subject to an overriding timing circuit also in block 27. The overriding timing circuit effects switching of the control apparatus to the next unit or station after a predetermined time, two minutes for example, even though there is still need for correction. This prevents undue delay or locking of the sensor at any one unit or station. The variable switching circuitry or the overriding timing circuit of the block 27 effects the operation of a suitable switching circuitry or assembly represented by the block 28. This circuitry simultaneously operates all of the switching devices 13, 18, 19, 20 and 26, as indicated by the several dashed lines of the block diagram, to switch the control apparatus from one unit or station to the next. While a control system for only two units 10 and 11 is illustrated in the block diagram of FIG. 1, it will be apparent that the system is readily adaptable to three or more units by merely increasing the number of control modules and extending the switching circuitry or assembly.

The three mode control circuitry contained in each of the control modules, such as the modules 16 and 17 of FIG. 1, is schematically illustrated in FIG. 2 of the drawings. Referring to FIG. 2, the analog voltage from sensor 12 of FIG. 1, which represents the value of the process variable, is introduced at point 30 to the control element or grid 31 of a cathode follower tube 32. A second analog voltage representing the desired value or set point of the process variable is established by the potentiometer 33 and this voltage is introduced at point 34 onto the control element or grid 35 of a second cathode follower tube 36 which has its plate connected to the plate of the follower tube 32. Proportional voltages are generated on the cathodes of the followers in a manner well known in the art of balanced cathode followers and appear at points 37 and 38, respectively. These two points are connected to potentiometer 39. Thus, the full error voltage representing the difference between the actual and desired values of the process variable will be across potentiometer 39. The positioning of slider 40 on potentiometer 39 enables any portion of this error voltage to be selected, thereby effecting an adjustment of the width of the proportional band, i.e., the change in process level needed to drive the controlling element through its entire range. While a cathode follower circuit of the vacuum tube type is shown in FIG. 2, it will be understood that equivalent solid state circuits and adder circuits can be equally well utilized as will be described later for FIG. 6.

Referring once more to cathode follower 32 at the input side of the control circuitry, it will be seen that capacitor 41 is connected at one side to the point 30 and at its other side to ground. The capacitor 41, which may have, for example, a capacity of approximately 10 microfarads, is thus connected across the input of the control circuitry and is charged to the value of the analog voltage representing the process value. Due to the very high input impedance of cathode follower 32, this voltage is maintained substantially constant during the entire time that the sensor is switched or connected to the other stations. The capacitor 41 serves as a memory storage element which maintains the control circuitry at substantially the last level or value of the process variable during the entire cycle of the switching operation. This provides for a smooth and substantially stepless transition in the switching of the control circuitry from one cycle to the next.

Referring again to FIG. 2 as a whole, the numeral 45 designates the servo motor for the unit control element, in this case a motorized valve. Motor 45 drives slider 46 of potentiometer 47. Potentiometer 47, together with resistors 48 and 49, constitute a bridge with power applied from a constant voltage source at points 50 and 51. When the bridge is unbalanced, a voltage appears across potentiometer 39A connected from the slider 46 of potentiometer 47 to the junction of resistors 48 and 49. The slider 52 of potentiometer 39A is ganged to the slider 40 of potentiometer 39 so that the amount of feedback voltage is changed at the same time as the proportional band width. The effect of this is to establish a definite relationship between a change in the process variable and change in controller output through the linking of the forward and feedback voltage loops.

The integrating circuit by which the integral or reset mode is operated consists of the capacitor 53 and a bank of resistors designated by the numeral 54. When an error occurs, an error voltage appears across the proportional band potentiometer 39 and a portion of this voltage selected by the slider 40 is impressed across resistors 55 and 56. The voltage appearing at the junction 57 of these two resistors results in an unbalanced voltage $V_e$ at the terminals 58, 59 of the control circuit output. This drives the valve motor 45 which makes an adjustment to the process in the proper direction and at the same time moves the slider 46 of potentiometer 47. A portion of the voltage derived from the potentiometer 47 is selected by the position of slider 52 on potentiometer 39A and thus charges capacitor 53 through resistor means 54. The rate at which capacitor 53 charges is established by the value of resistor 54 which constitutes the reset adjustment.

The operation of the integral or reset mode will be understood from the following sequence. Assume that the contoller is lined out, or the error is zero, and thus the voltage $V_e$ at the output terminals 58 and 59 is equal to zero and the valve motor is stationary. Capacitor 53 is discharged and the voltage across resistor 54 is therefore zero. A load change is then imposed on the controlled device, such as a furnace, which results in an error voltage at terminal 58 which causes the valve motor to move to attempt to restore balance. The valve motor moves the slider of potentiometer 47 to a new position and capacitor 53 charges through the reset resistor 54. This creates an opposing voltage across the output terminals 58 and 59 which opposes the error voltage and the motor eventually stops. If the original error still persists, the charging rate of capacitor 53 slows and the drop across resistor 54 lessens so that an unbalanced voltage again appears at the output terminals 58, 59 and the motor moves as before, such periodic repeating of the "error" being the basis of the term "reset." As a result of the changed valve position, the process will gradually respond and approach set point, but as long as any error exists, the integrating action of capacitor 53 and resistor 54 will continue until eventually the process lines out with capacitor 53 discharged and the valve motor in a new position as required by the demand change imposed on the process.

The derivative or rate circuit consists of resistors 55 and 56, the variable resistor 60 and the capacitor 61. To be operative, switch 62 is closed. Describing operation of the circuit, when the error is not changing, the portion of the error voltage at the junction 57 of resistors 55 and 56 appears at the output terminals 58, 59. If, however, the error is changing, the impedance of capacitor 61 is lowered depending on the rate of change of the error and a correspondingly greater portion of the error voltage appears at terminals 58, 59. The variable resistor 60 determines the charging rate of capacitor 61. Since capacitor 61 will both charge or discharge depending upon direction of change of the error voltage, this circuit can serve to provide increased control action when needed or can serve to prevent overshoot of the control point.

The provision of an individual control module for each of the units or control channels, together with ability for independent adjustment of the proportional band and differential and integral time constants of the above described control circuitry, also provides for individual channel tuning to the needs of the unit process. This is an important feature of the present control system since it is very seldom that the characteristics (i.e., speed of response and stability) of the controlled process will be the same among the several units of a multipoint system. The ability to optimize the system response for each controlled channel alleviates this condition.

FIGS. 3 and 4 of the drawings diagrammatically illustrate the operation of the variable switching portion (depending upon demand) of the control system, i.e., the portion of the circuitry contained in block 27 of FIG. 1. Referring to FIG. 3, $V_e$ represents the composite error voltage (error voltage plus differential and integral voltages) which is fed from the output terminals 58, 59 of the voltage control circuitry of FIG. 2 to amplifier 25 which drives servo motor 45. An A.-C. signal 65, whose amplitude is proportional to the voltage $V_e$, is taken from the amplifier 25 and fed to diode 66. The resulting D.-C. voltage is used to charge capacitor 67 across which is connected resistor 68. The voltage $V_c$ at any time across the resistor-capacitor combination is fed to a gate 69 set to trip the channel switching circuitry of block 28 (FIG. 1) whenever the voltage $V_c$ falls below a certain value $V_t$. It is essential that the capacitor 67 be charged at the time control is switched, otherwise a second channel switch would immediately be made since the voltage $V_c$ on the capacitor would probably be below the gate threshhold as a result of the prior switching operation. This charge is obtained from voltage source 70 through switch 71 which is opened only after switching has taken place. Switch 71 is briefly closed during each switching operation.

FIG. 4 shows a typical plot of voltage $V_c$ across the resistor-capacitor combination as a function of time. Immediately after switching, the capacitor is charged to $V_b$. Switch 71 opens and the capacitor starts to discharge. After a brief time, the capacitor has discharged to point 72 at which point the motor 45 moves as a result of a signal from the amplifier 25, and the A.-C. signal 65 charges the capacitor 67 through diode 66 to the point 73, at which time the motor stops and the capacitor discharges to point 74, recharges with motor movement to point 75, etc. Eventually, as the process comes closer to set point, motor adjustments become more infrequent and the discharge times longer so that the voltage level drops to the gate voltage $V_t$, the channel is switched to the next station, and the process is repeated.

As above described, it is essential that an overriding switching signal be applied after $t$ minutes (two minutes, for example) in case balance is not achieved within the $t$ minute period. This is done in the present embodiment by a second resistor-capacitor parallel combination which is charged from a voltage source at the beginning of the timing period and then allowed to drain to the trip voltage $V_t$ after $t$ minutes.

The circuits whereby the variable and overriding timing functions are obtained are illustrated in FIG. 5. In FIG. 5, the A.-C. signal from the voltage amplifier 24 is introduced at point 80. Capacitor 81 and resistor 82 are coupling elements. Diode 66 is a threshold noise limiter which is connected to the gate of field effect transistor (FET) 83. The direct connected transistor pair 83, 84 amplify the voltage excursions 73, 75, etc., of FIG. 4 while potentiometer 85 serves to control the charging level of the storage capacitor 67 which is charged through the voltage double diodes 86 and relay switch contacts R9–1, shown in the timing position. The voltage on the storage capacitor 67 is connected to the gate of the FET 88 through resistor 87. With the capacitor 67 charged sufficiently positive, the FET 88 is cut off and the pulses from the output of the astable multivibrator 89 do not appear on the source potentiometer 90. As the voltage on the gate of transistor 88 becomes less positive and approaches $V_t$ (FIG. 4), transistor 88 starts to conduct and pulses are transmitted to the base of transistor 91, the amplitude of the pulses being controlled by the potentiometer 90, which constitutes the trigger level control. The pulses are amplified and inverted in polarity by transistor 91 and are transferred to the cathode gate 94 of the silicon controlled switch (SCS) 95 through capacitor 92 and resistor 93. The network of diode 96, resistors 93 and 98 and capacitor 97 protect the cathode gate and prevent false triggering. A pulse of the proper amplitude on the cathode gate 94 of SCS 95 puts the latter into a conducting state and actuates relay R10 which switches channels through contact R10–1. A similar timing circuit consists of capacitor 100, resistor 101, and transistors 102 and 103. Pulses from the multivibrator 89 are fed to the cathode gate 94 of transistor 95 through capacitor 104 and resistor 93. The time constant of the resistor-capacitor combination 101 and 100 is such as to provide an override time $t$ equal to about two minutes.

At the same time that relay R10 is picked up, thereby transferring control to the next unit, the 30-second delay circuit 105 is reset through contact R6–1 which charges condenser 108 which initiates the delay circuit 105. This holds relay R9 in for 30 seconds. At the end of 30 seconds, relay R9 drops out, thereby resetting the variable and two-minute circuits. At the same time, relay R10 is dropped out when the SCS 95 is returned to the nonconducting state by the discharge of capacitor 106 through contact R9–2 of relay R9, and diode 107. Hereafter, the same cycle described above is repeated. The switch contacts for a relay are designated by a number connected to the relay number, e.g., R9–2. There may be other contacts but description thereof is not necessary for an understanding of this invention.

It will be apparent from the foregoing description that the two FET's 88 and 102 are held in the nonconducting state while their gates are held positive above a critical value. In the nonconducting state, pulses from the multivibrator 89 cannot reach the cathode gate of SCS 95. If the gate potential of either FET drops below the critical value, pulses from the multivibrator can reach through that FET to the SCS. The important part of this circuit arrangement is that each timing circuit acts independently of the other. The number of triggers operated in this manner can be increased indefinitely. Thus, each channel can be provided with its own variable timing circuit so that the trigger point can be independently adjusted. This is advantageous because some devices can be kept in control with very little movement of the modulating valve, whereas others require continuous valve action even though the process is within control limits. In other words, some channels will fluctuate while others will not. The ability to set the trigger point independently for the two cases is a great advantage and may be obtained with the circuit of the subject device.

Merely as an example, in place of the cathode follower circuit of FIG. 2, two field effect transistors 109, 110 (FIG. 6) may be employed to provide a correction signal across points 111, 112. The process level is fed to transistor 109 at 113 and the set point level at 114. The memory capacitor is at 115. The FET transistors are of the P type. If of the N type, the polarity of the supply would be reversed. This circuit operates in a manner similar to that described for FIG. 2.

While an exemplary embodiment of the invention has been shown and described, it will be evident that modifications, changes and alterations may be made therein without departing from the spirit of the invention, and it is to be understood that the invention is not to be limited by the details of the particular embodiment shown or the particular circuit elements used, but only the scope of the appended claims.

What is claimed is:

1. In a multipoint industrial control system, the combination of a plurality of units to be controlled, a common sensing means for successively sensing a process variable in each of said units, a control circuitry means for each of said units, each of said control circuitry means being adapted to produce an error signal representing the deviation of the measured variable from a desired set point level, control means for each of said units, said control means being adapted to vary a process control means of the unit in accordance with the error signal of the unit, and means for successively switching said sensing means from one unit to another and substantially simultaneously switching the output of the sensing means to the control circuitry means of the unit.

2. A multipoint control system as defined in claim 1 wherein each of said control circuitry means includes a proportional band circuit means, an integral control circuit means, and a derivative control circuit means, each of said last named circuit means having means for independently adjusting the proportional band width and the time constants of the integral control circuit and the derivative control circuit.

3. In a multipoint control system comprising a plurality of units to be controlled for a process variable therein, each of said units having a control circuitry means responsive to sensing means for said process variable thereby successively to produce an error signal representing a deviation of each measured variable from a desired set point level, and control means for each of said units adapted to vary said process variable in accordance with said error signal, the combination which includes a memory storage means associated with the input of each control circuitry means to maintain the process level of the circuitry substantially constant while said sensing means is connected to other units thereby to effect substantially stepless transition from station to station.

4. A multipoint control system as defined in claim 3 wherein said control circuitry means has high input impedance and said memory storage means comprises a capacitor connected across the input.

5. A multipoint control system as defined in claim 3 in which the input to said control circuitry means is the control element of an electronic device.

6. A multipoint control system as defined in claim 3 in which the input to said control circuitry means is the control element of an electronic device of a solid state type.

7. A multipoint control system as defined in claim 3 in which the input to said control circuitry means is connected to the control element of an electronic device of the field effect transistor type.

8. A multipoint control system as defined in claim 3 in which the input to said control circuitry means is connected to the control element of an electronic device of the cathode follower type.

9. A multipoint control system as defined in claim 3 wherein each of said control circuitry means comprises a separate module.

10. A multipoint control system as defined in claim 3 wherein each of said control circuitry means includes a proportional band circuit means, an integral control circuit means, and a derivative control circuit means, each of said last named circuit means having means for independently adjusting the proportional band width and the time constants of the integral control circuit and the derivative control circuit.

11. A multipoint control system as defined in claim 3 wherein each control circuitry means includes at least two modes of control circuit means, each of said circuit means having means for independently adjusting the same.

12. In a multipoint control system comprising switching means, a plurality of units to be controlled for a process variable therein, each of said units having a control circuitry means responsive to sensing means for said process variable thereby successively to produce an error signal representing a deviation of each measured variable from a desired set point level, and control means for each of said units adapted to vary said process variable in accordance with said error signal, the combination which includes circuit means for successively effecting time variable operation of said switching means in accordance with process demand, said circuit means for effecting time variable operation of the switching means including a capacitor and shunting resistor connected to the input circuit of a voltage sensing means.

13. A multipoint control system as defined in claim 12 wherein an amplifier means is connected between said control circuitry means and said control means, and said capacitor and shunting resistor are connected to said amplifier means through a non-linear element.

14. A multipoint control system as defined in claim 12 in which an overriding timing circuit means provides for effecting operation of said switching means after a predetermined dwell of said sensing means at any one unit.

15. A multipoint control system as defined in claim 12 in which reset means provide for recharging said capacitor after each switching operation.

16. A multipoint control system as defined in claim 15 in which said reset recharging means includes relay operated switching means operated substantially simultaneously with the operation of said switching means.

17. A multipoint control system as defined in claim 12 in which said circuit means includes reset means operable after each switching operation and said reset means includes time-delay circuit means.

18. The method for controlling the unit process of a plurality of separate units in a multipoint control system which comprises successively sensing a process variable in each of said units by a common sensor, successively feeding a signal representing the level of said variable from said sensor to a plurality of set point comparators, there being a separate comparator for each unit, and utilizing successive error signals from said comparators for effecting corrective control of the respective unit processes.

19. A method as defined in claim 18 which includes the step of controlling the dwell time of the sensor at each unit in accordance with the demand need of the unit process for correction.

20. A method as defined in claim 19 which includes the step of moving the sensor to the next unit after a predetermined time dwell at any one unit.

21. A method as defined in claim 18 which includes the step of maintaining the last measured value of the process level signal of each unit at the comparators substantially constant during the interval the sensor is sensing other units.

22. In a multipoint industrial control system, the combination of a plurality of units to be controlled, a common sensing means for successively sensing a process variable in each of said units, a control circuitry means for each of said units, each of said control circuitry means being adapted to produce an error signal representing the deviation of the measured variable from a desired set point level, control means for each of said units, said control means being adapted to vary a process control means of the unit in accordance with the error signal of the unit, means for successively switching said sensing means from one unit to another and substantially simultaneously switching the output of the sensing means to the control circuitry means of the unit, a memory storage means associated with the input of each control circuitry means to maintain the process level of the circuitry substantially constant while said sensing means is connected to other units thereby to effect substantially stepless transition from station to station.

References Cited

UNITED STATES PATENTS

| | | | |
|---|---|---|---|
| 3,310,663 | 3/1967 | Bouman | 235—151.1 |
| 3,372,568 | 3/1968 | Lemelson | 318—162X |
| 3,400,223 | 9/1968 | Pedrotti et al. | 318—18X |
| 3,417,235 | 12/1968 | Clark et al. | 318—18X |

BENJAMIN DOBECK, Primary Examiner

U.S. Cl. X.R.

235—151.11; 318—590, 609